(12) United States Patent
Allen et al.

(10) Patent No.: US 7,243,246 B2
(45) Date of Patent: Jul. 10, 2007

(54) SYSTEM HAVING A POWER ADAPTER THAT GENERATES A DATA SIGNAL BASED ON THE STATE OF A EXTERNAL POWER SOURCE THAT IS USED TO MANAGE THE POWER CONSUMPTION OF A CPU

(75) Inventors: Robert Allen, Cedar Park, TX (US); William O. Bain, Leander, TX (US)

(73) Assignee: Dell Products L.P., Austin, TX (US)

( * ) Notice: Subject to any disclaimer, the term of this patent is extended or adjusted under 35 U.S.C. 154(b) by 418 days.

(21) Appl. No.: 10/741,400

(22) Filed: Dec. 19, 2003

(65) Prior Publication Data
US 2005/0138437 A1     Jun. 23, 2005

(51) Int. Cl.
*G06F 1/00* (2006.01)
(52) U.S. Cl. .................................................. 713/300
(58) Field of Classification Search ................ 713/300, 713/320; 320/137; 363/71, 142
See application file for complete search history.

(56) References Cited

U.S. PATENT DOCUMENTS

| | | | |
|---|---|---|---|
| 5,987,613 A | 11/1999 | Busch et al. ................. 713/300 |
| 6,172,891 B1 | 1/2001 | O'Neal et al. ............... 363/146 |
| 6,204,637 B1 * | 3/2001 | Rengan ....................... 320/137 |
| 6,418,535 B1 * | 7/2002 | Kulakowski et al. ........ 713/320 |
| 6,597,565 B1 | 7/2003 | Kluth et al. ................. 361/679 |
| 6,600,298 B2 | 7/2003 | McDonald et al. .......... 323/271 |
| 6,751,107 B2 * | 6/2004 | Matsuda et al. .............. 363/71 |
| 6,903,950 B2 * | 6/2005 | Afzal et al. .................. 363/142 |
| 2002/0112191 A1 * | 8/2002 | Pelissier et al. ............ 713/300 |
| 2003/0026071 A1 | 2/2003 | Hood, III et al. ........... 361/683 |
| 2005/0053070 A1 * | 3/2005 | Vyssotski et al. ........... 713/300 |

* cited by examiner

*Primary Examiner*—Thomas Lee
*Assistant Examiner*—Sean Weinman
(74) *Attorney, Agent, or Firm*—Hamilton & Terrile, LLP; Gary W. Hamilton

(57) ABSTRACT

A system and method for determining the type of power source supplying electrical power to a power adapter for a portable computer. In an embodiment of the invention, a power adapter for a portable computer is provided with a first power identification circuit for generating system information relating to operation on an AC power source and a second power identification circuit for generating system information relating to operation on a DC power source. A power source detector is operable to detect whether the electrical power supplied to the power adapter is AC or DC power and to enable the first or second power identification circuit, respectively, thereby generating a data signal indicating the respective type of power source. The data signal is provided to a subsystem manager in the computer to allow identification of the type of external power source. The information regarding the type of external power source can be used by the portable computer to control various operating parameters, including the charging state of the battery and the power consumption levels of various system components.

3 Claims, 4 Drawing Sheets

SYSTEM HAVING A POWER ADAPTER THAT GENERATES A DATA SIGNAL BASED ON THE STATE OF A EXTERNAL POWER SOURCE THAT IS USED TO MANAGE THE POWER CONSUMPTION OF A CPU

BACKGROUND OF THE INVENTION

1. Field of the Invention

The present invention relates to the field of information handling systems, and more particularly to a method and system for controlling delivery of electrical power to a portable information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems configured as portable computers have grown increasingly favored by businesses and individuals due to the flexibility of their use. Portable computers typically include a battery to power components so that the portable computer may be carried and used independent of fixed power sources. Although internal power sources provide greater flexibility, they typically have a limited duration and need periodic recharging. If portable computers are not recharged before the battery discharges completely, the portable computer may shutdown resulting in a loss of active data and an inability by the user to turn the portable computer system on again unless an external power source is connected. A method and system for determining external power availability is generally described in U.S. Pat. No. 6,597,565 issued to Kluth et al., issued on Jul. 2, 2003, which by this reference is incorporated herein for all purposes.

Many of today's airline, automobile and train passengers carry portable computers on-board for in-transit use. However, since portable computers consume relatively large amounts of power, the batteries that operate the device do not last for more than typically 2–6 hours. On long trips or when the battery is weak, a computer can drain the battery quite rapidly. For the traveler attempting to minimize the weight of their computer luggage, heavy spare batteries are undesirable and still only provide a nominal amount of additional computer operating time.

Because the use of computers during travel is so common, some airlines and trains have begun offering in-seat power systems for powering devices such as portable computers. These power systems often provide DC power via an in-seat connector that is typically either a modified version of the standard auto cigarette lighter socket or a manufacturer-specific plug configuration. Standard power adapters used with portable computers, however, typically are designed to work with AC power. As will be understood by those of skill in the art, different power adapter system components are required when operating a portable computer on DC power instead of AC power. There is a need, therefore, for the portable computer to receive information regarding the type of power being supplied to the power adapter. In addition, there is a need for a method and system to enable a portable computer to modify its operating parameters to enter various charging modes and various power consumption modes depending on the type of power source supplying power to its power adapter.

SUMMARY OF THE INVENTION

In accordance with the present invention, a system and method is provided for determining the type of power source supplying electrical power to a power adapter for a portable computer. The power adapter used with the portable information handling system of the present invention has a source connector that connects to either an AC or a DC power source. Power conversion circuitry in the power adapter is operable to convert AC power to DC power when the power adapter is connected to an AC power source. Alternatively, if the power adapter is connected to a DC power source, circuitry in the power adapter converts the DC power to appropriate voltage and current levels for use by the portable computer.

In an embodiment of the present invention, a power adapter for a portable computer is provided with a first power identification circuit for generating system information relating to operation on an AC power source and a second power identification circuit for generating system information relating to operation on a DC power source. A power source detector is operable to detect whether the electrical power supplied to the power adapter is AC or DC power and to enable the first or second power identification circuit, respectively, thereby generating a data signal indicating the respective type of power source. The data signal is provided to a subsystem manager in the computer to allow identification of the type of external power source. The information regarding the type of external power source can be used by the portable computer to control various operating parameters, including the charging state of the battery and the power consumption levels of various system components.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
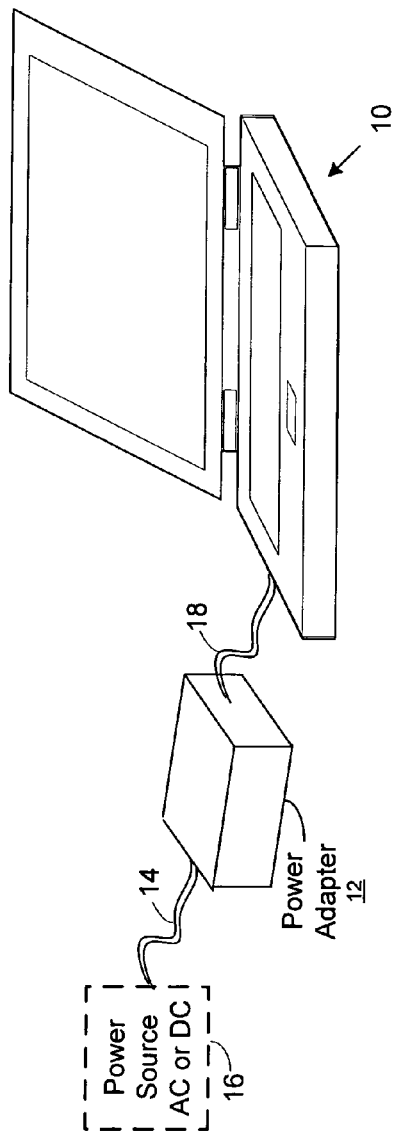
FIG. 1 is a general illustration of a portable information handling system connected to a power adapter capable of generating power from either an AC or a DC power source.

FIG. 1 is an illustration of a portable information handling system 10 operable to receive electrical power from a power adapter 12 in accordance with the present invention. The power adapter 12 is operably connected via a cable bundle 14 to a power source 16 that can provide either AC or DC power. As will be discussed in greater detail below, the power adapter 12 comprises identification circuitry operable to provide information to the portable information handling system 10 regarding whether the power source is providing AC or DC power. The information regarding the state of the power source 16 is provided via a data wire in cable bundle 18. The information system 10 is operable to utilize the information provided by the power adapter 12 to modify its operating parameters to enter various charging modes and various power consumption modes, as described hereinbelow.

For purposes of this application, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
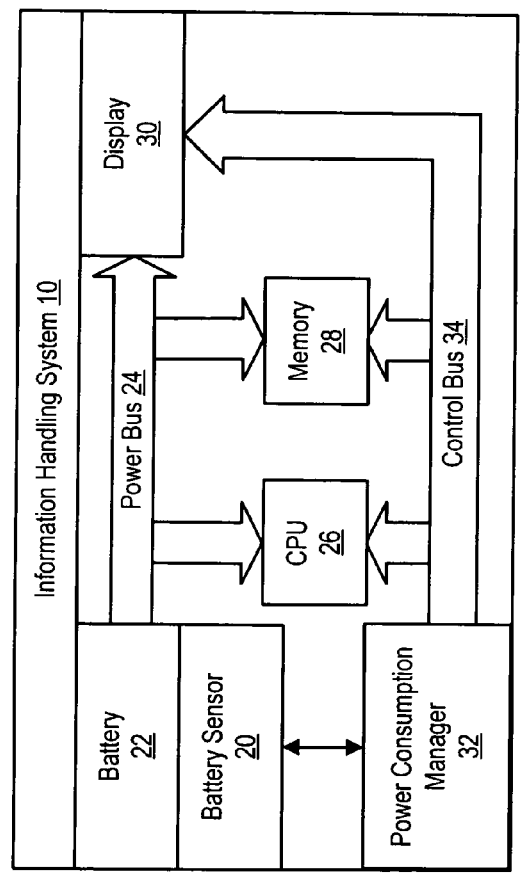
FIG. 2 is a block diagram of system components of an information handling system for dynamic power management.

Referring now to FIG. 2, a block diagram depicts an information handling system 10 configured to dynamically adjust power consumption of the various system components. Battery sensors 20 monitor the battery discharge state of battery 22, such as total charge remaining and current discharge through power bus 24 to provide power to information handling system components including a CPU 26, memory 28 and display 30. A power consumption manager 32 interfaces with battery sensors 20 and apply the measurements of the battery discharge state to manage power consumption by the components through a control bus 34. For instance, power consumption manager 32 is a firmware module operating on a microprocessor that commands desired power consumption modes in the components to provide power consumption of at least a desired margin below maximum battery current discharge capacity.

Figure 3:
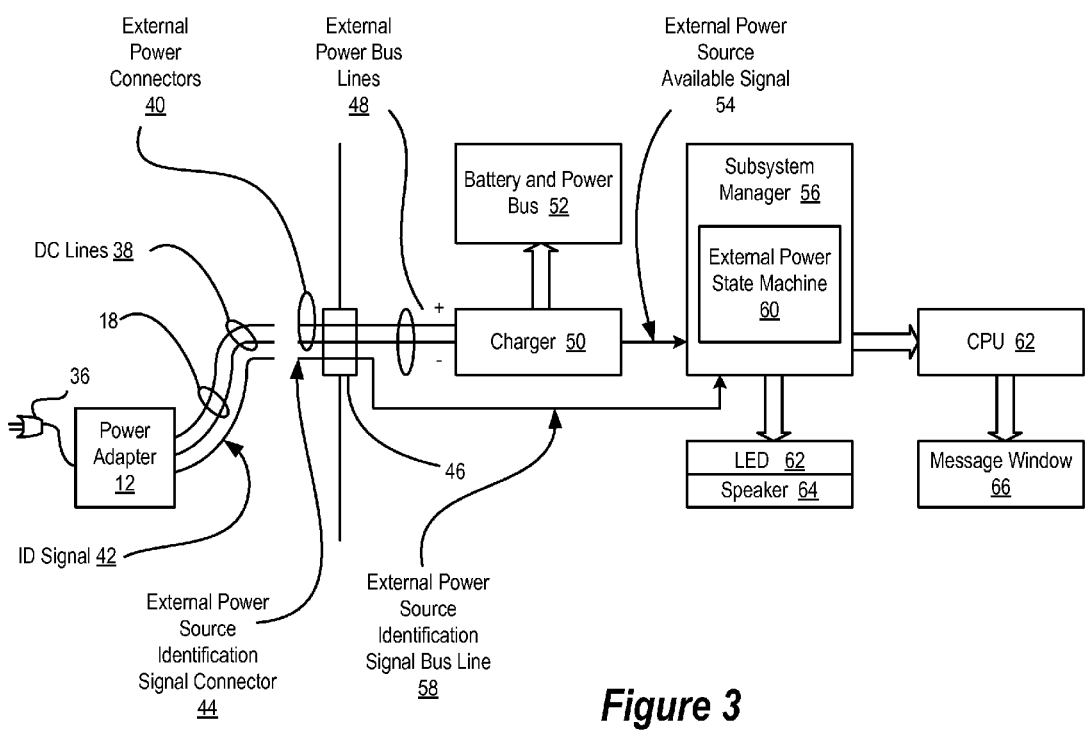
FIG. 3 is a block diagram of a portable computer information handling system configured to determine external power states.

Referring now to FIG. 3, a block diagram depicts a system for determining the status of an external power system that provides power to an information handling system 10. A power adapter 12, described in greater detail below, accepts alternating current from a plug 36 and converts the alternating current into direct current. Two direct current lines 38 in cable bundle 18 carry a positive and negative direct current power signal to two external power connector pins 40 integrated with information handling system 10. An external power source identification signal line 44 carries an external power source identification signal to an external power source identification signal connector pin 40 integrated with information handling system 10.

External power connector 46 provides external power and identification signals to information handling system 10 bus lines. The DC power signal proceeds from external power connector pins 40 across external power bus lines 48 to a charger 50. Charger 50 regulates power flow for use by battery and power bus 52 to power information handling system 10 and recharge internal power source batteries. For instance, charger 50 may act as power supply circuit that regulates power use by information handling system 10, such as by selecting internal or external power sources. Charger 50 outputs an external power source available signal through an external power source available signal bus line 54 to a subsystem manager 56 to indicate if external power is available to the information handling system. The external power source identification signal proceeds from external power source identification signal connector pin 44 through an external power source identification signal bus line 58 to subsystem manager 56 to allow the identification of the type of power source by subsystem manager 56.

Subsystem manager 56 is, for instance, a Super I/O processor that manages information subsystem operation, such as a Super I/O processor available from Silicon Microsystem Corporation. An external power state machine 62 operates on subsystem manager 56 to determine the status of external power for information handling system 10. For instance, external power state machine 60 operates as a software module with instructions to compare the external power source identification signal and the external power source available signal to determine that external power is available, not available or faulty. An external power available state is determined if the external power source identification signal indicates that an identified external power source is connected to connector 46 and the external power source available signal indicates that power is available from charger 50. An external power unavailable state is determined if the external power source identification signal indicates no identification and the external power source available signal indicates that external power is not available from charger 50. An external power fault state is indicated if the external power source identification signal and the external power available signal are inconsistent. For instance, an external power state fault is determined if one of the external power source identification and external power source available signals indicate the presence of an external power state and the other does not.

Subsystem manager 56 communicates with various information handling system components to provide notice of external power source states to users. For instance, an external power state fault may be indicated by a signal from subsystem manager 56 to LEDs 62 to display a fault indication of to speaker 64 to sound an audible alarm. Similarly, LEDs 62 may indicate external power available and external power unavailable states, such as by illuminating a charge LED if an external power available state is determined or flashing the charge LED when a change in state to external power unavailable is determined. Alternatively, subsystem manager 56 may provide a system management interrupt (SMI) to CPU 26 to trigger the display of a message window 66 indicating the external power state. Message window 66 may help to logically debug a broken external power cable by indicating the location of the fault in a visible message to the user.

Figure 4:
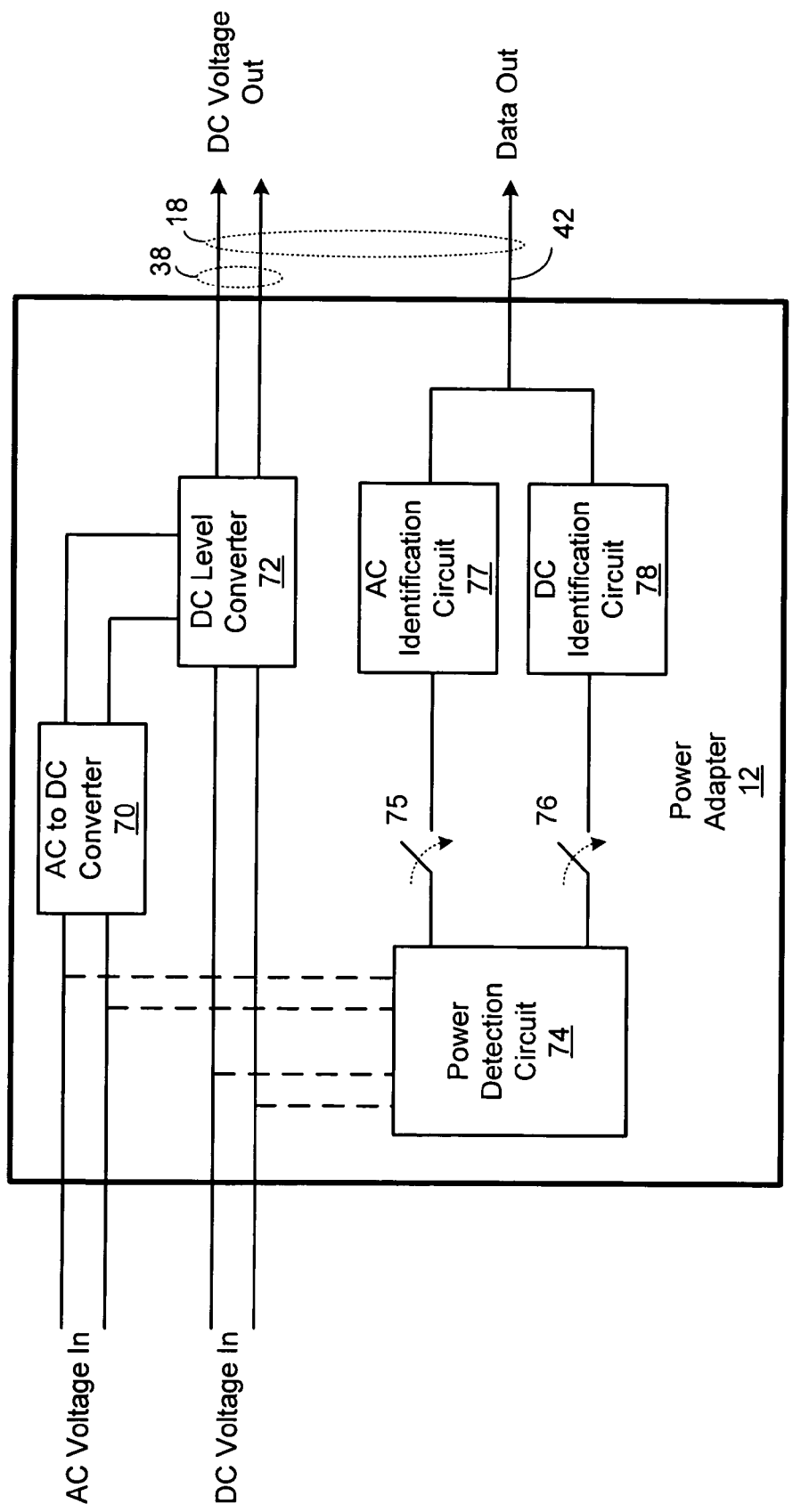
FIG. 4 is a block diagram of a power adapter comprising a plurality of identification circuits operable to generate data corresponding to the type of power source.

FIG. 4 is a block diagram of the system components of the power adapter 12 discussed hereinabove. The power adapter 12 is operable to receiver power from either an AC power source or a DC power source. If the power adapter 12 is connected to an AC power source, the power is converted to DC power by the AC-to-DC converter 70. If the power adapter 12 is connected to a DC power source, no conversion is necessary, although the DC voltage level may need to be modified by the DC level converter 72 to ensure that the DC voltage level is compatible with the voltage levels required by the system components in the portable information handling system 10. A power detection circuit 74 is operable to detect whether the power source is AC or DC and to close switch 76 or switch 76, thereby activating AC identification circuit 77 or DC identification circuit 78, respectively. If the power detection circuit 74 detects incoming AC power, switch 75 is closed and the AC identification circuit 77 is activated, thereby transmitting a data signal on line 42 indicating that the DC power carried on DC power lines 38 is generated from an AC power source. If, however, the power detection circuit 74 detects incoming DC power, switch 76 is closed and the DC identification circuit 78 is activated, thereby transmitting a data signal on line 42 indicating that the DC power carried on DC power lines 38 originates from a DC power source. The data signal carried on line 42 is used by the power management components of the information handling system to implement various power management functions. For example, if the data signal on line 42 indicates that the external power source is AC, the power management components may allow the battery to be fully charged and the various system components, such as the display, to operate at full power. If, on the other hand, the data signal on line 42 indicates that the external power is from a DC source, the power management components may limit the charging of the battery and also limit the power consumption of the various system components.

In an embodiment of the present invention, the AC identification circuit 77 and the DC identification circuit 78 are implemented using DS2501 circuits manufactured by Dallas Semiconductor Corporation. This circuit is capable of generating a 64 bit data word to provide data relating to numerous parameters of the power adapter 12. For example, the data word can contain information relating to the model and revision number of the power adapter, the output voltage, current output and error checking data.

Figure 5:
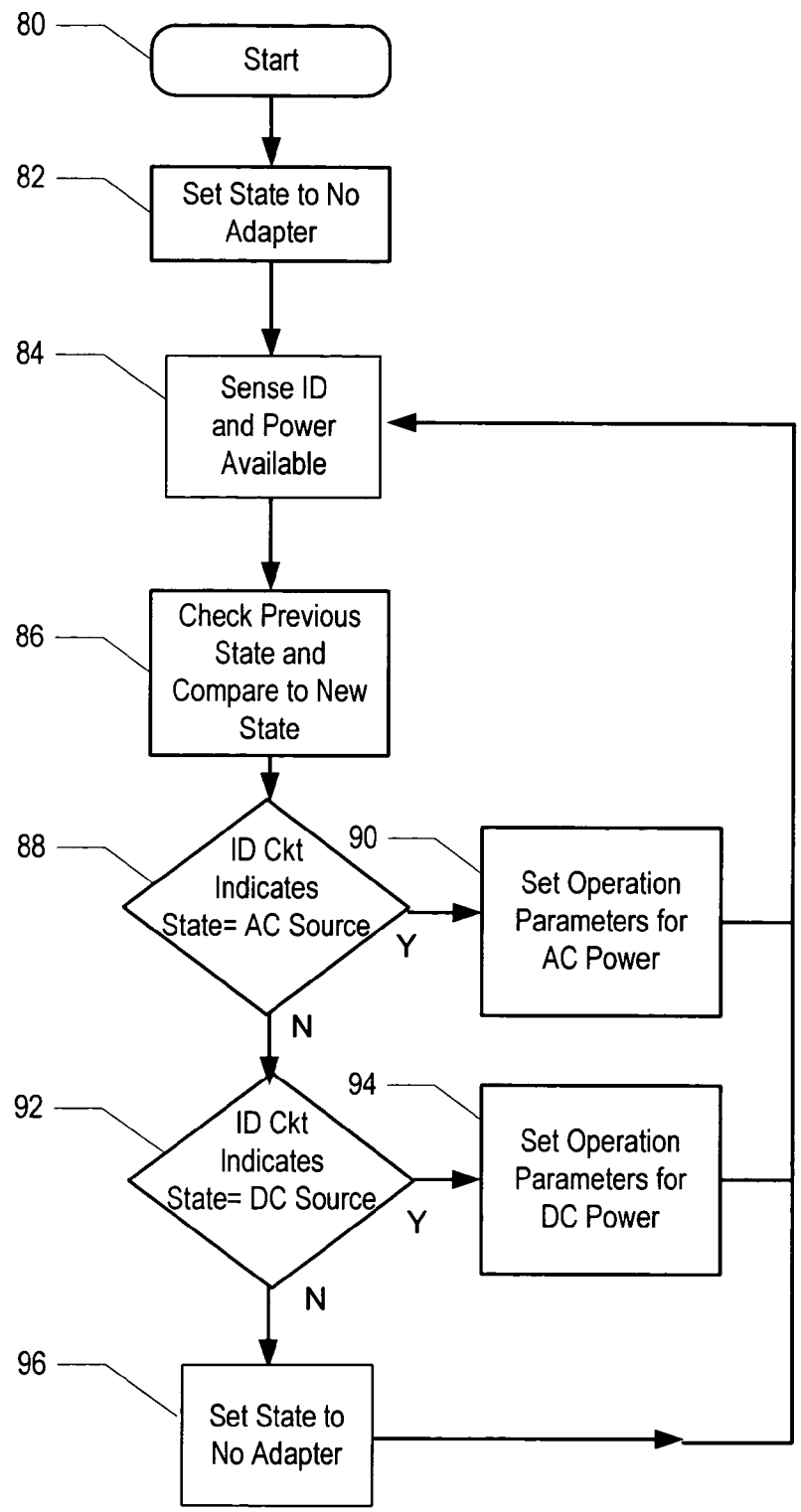
FIG. 5 depicts a flow diagram of the processing steps implemented by a portable information handling system for determining external power states and using the external power states to control operating parameters.

Referring now to FIG. 5, a flow diagram depicts a process for the external power state machine 60 to determine an external power state corresponding to an AC power source or a DC power source. The process starts at step 80, such as with power up of the information handling system, and proceeds to step 82, at which the external power state is initialized to a "no external power" state with no external power adapter interfaced with the information handling system. At step 84, the external power identification signal is "pinged" for connection by polling the identification chip of the power adapter 12 and the power available status signal provided by the power adapter 12 is taken. The specific communications are determined by the previous and current external power states.

At step 86, the previous state is compared to the current state to determine if a change in state has occurred. If, for instance a change in state has occurred, notification to the user of a change in state may be appropriate. The process proceeds to step 88 where a determination is made of whether the identification circuit 77 is active indicating that the current state is AC power. If the test conducted in step 88 indicates an AC power source, then at step 90 the operating parameter of the system are set for AC power. If test conducted in step 88 indicates that the identification circuit 77 is not active, processing proceeds to step 92 where a test is conducted to determine if the identification circuit 78 is active, indicating a DC power source. If the test conducted in step 92 indicates that the identification circuit 78 is active, processing proceeds to step 94 where operating parameters for the system are set for DC power operation. If, however, the results of the test conducted in step 92 indicates that the identification circuit 78 is not active, processing proceeds to step 96 where the state is set to "no adapter" and processing returns to step 84.

Although the present invention has been described in detail, it should be understood that various changes, substitutions and alterations can be made hereto without departing from the spirit and scope of the invention as defined by the appended claims.

What is claimed is:

1. An information handling system comprising:
    a central processing unit operable to process information;
    a battery operable to provide power to the central processing unit;
    a power adapter interfaced with a charger to accept an external power flow from an external power source having first and second states, said power adapter comprising:
        a first identification circuit operable to generate a first data signal indicating a first state of said external power source; and
        a second identification circuit operable to generate a second data signal indicating a second state of said external power source; and
    a subsystem manager interfaced with the central processing unit, the power adapter, the subsystem manager operable to use said first and second data signals to manage power consumption in said information handling system.

2. The information handling system of claim 1 configured as a portable computer.

3. The information handling system of claim 1, wherein the subsystem manager is further operable to cause said information handling system to operate in accordance with a first set of operating parameters when said external power source is in said first state and to cause said information handling system to operate in accordance with a second set of operating parameters when said external power source is in said second state.

* * * * *